M. M. CLARKE.
FISH SCALING TOOL.
APPLICATION FILED SEPT. 12, 1910.
1,000,073.
Patented Aug. 8, 1911.
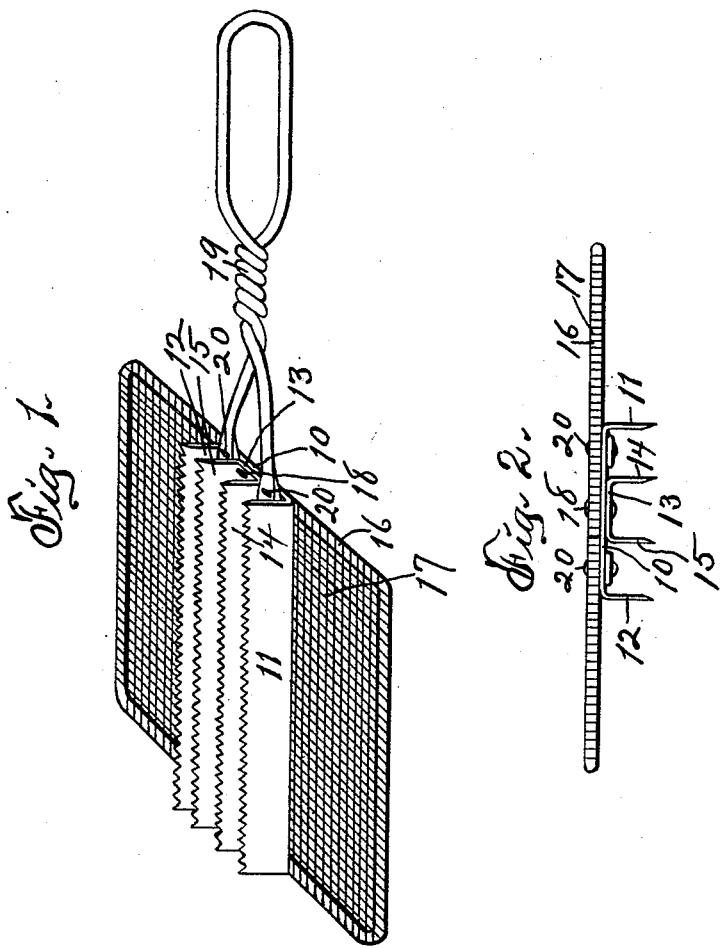

UNITED STATES PATENT OFFICE.

MARY M. CLARKE, OF DES MOINES, IOWA.

FISH-SCALING TOOL.

1,000,073.  Specification of Letters Patent.  Patented Aug. 8, 1911.

Application filed September 12, 1910. Serial No. 581,589.

*To all whom it may concern:*

Be it known that I, MARY M. CLARKE, citizen of the United States of America, and resident of Des Moines, Polk county, Iowa, have invented a new and useful Fish-Scaling Tool, of which the following is a specification.

The object of my invention is to provide an improved construction for fish-scaling tools.

My invention consists in the construction, arrangement and combination of elements hereinafter set forth, pointed out in my claim and illustrated by the accompanying drawing, in which—

Figure 1 is a perspective showing the tool in inverted position. Fig. 2 is an end elevation of the tool.

In the construction of the device as shown the numeral 10 designates a plate formed with integral flanges 11, 12 on its side margins and at right angles to the body of the plate. A relatively narrower plate 13 is mounted on the center of the plate 10 and is formed with integral flanges 14, 15 on its side margins and at right angles to the body thereof. The plate 13 is so arranged on the plate 10 that the flanges 11, 14, 15 and 12 are parallel with each other and equally spaced apart. The flanges 11, 12, 14, 15 preferably are formed with toothed margins. A rectangular frame 16 is provided and preferably is overlaid by and secured to the margins of a meshed or reticulated sheet 17. The plate 10 is mounted transversely of the central portion of the frame 16 and reticulated sheet 17 and is secured thereto by rivets 18, which rivets also extend through and secure the plate 13. A handle 19 is provided and preferably is formed of looped and twisted wire. The handle 19 is arranged with its arms extending between the flanges 11, 14 and 12, 15 respectively and in contact with the plate 10 and said handle preferably is secured to the plate 10 and frame 16 by rivets 20 in any desired number, two of said rivets being shown in Fig. 1.

The tool above described is employed in the operation of removing scales from fish by scraping, scratching or currying the scaly surface with the toothed margins of the flanges 11, 14, 15, 12. The toothed margins of the flanges engage, tilt and remove the scales from the surface of the fish and the reticulated plate 17 limits and prevents scattering of the scales. The reticulated shield 17 not only prevents the scales from flying upward and scattering over the surrounding surfaces including the person and clothing of the operator, but also, on account of its reticulation, enables the operator to see the surface of the fish through the plate during the operation of scaling. Because of the perforated or reticulated construction of the plate the tool can more readily be cleaned and have the scales removed therefrom, by holding the tool in normal position as shown in Fig. 2 under a stream of water from a faucet or by passing the tool through a body of water, the water passing freely through the spaces of the plate.

In use the tool preferably is moved on a line transversely of the handle 19 or through an arc having its center approximately at the outer end of said handle. The rigidly connected plates 10 and 13 and their flanges provide a substantial and relatively stiff support for the teeth and said plates also provide a substantial and relatively stiff support for the reticulated sheet or plate 17.

I claim as my invention—

A fish scaling tool, comprising in combination a scraper, a frame secured to the scraper and having portions disposed on either side thereof, a guard formed of reticulated material stretched over and secured to the frame, and a handle connected to the scraper.

Signed by me at Des Moines, Iowa, this fifth day of July, 1910.

MARY M. CLARKE.

Witnesses:
ERLE W. MILLER,
EARL M. SINCLAIR.